(12) United States Patent
Tholfsen et al.

(10) Patent No.: US 12,087,277 B2
(45) Date of Patent: Sep. 10, 2024

(54) PHONEME MISPRONUNCIATION RANKING AND PHONEMIC RULES FOR IDENTIFYING READING PASSAGES FOR READING PROGRESS

(71) Applicant: Microsoft Technology Licensing, LLC, Redmond, WA (US)

(72) Inventors: Michael Tholfsen, Newcastle, WA (US); Paul Ronald Ray, Kirkland, WA (US); Kevin Chad Larson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 661 days.

(21) Appl. No.: 17/325,882

(22) Filed: May 20, 2021

(65) Prior Publication Data

US 2022/0375455 A1   Nov. 24, 2022

(51) Int. Cl.
*G10L 15/22* (2006.01)
*G10L 15/02* (2006.01)
*G10L 15/06* (2013.01)
*G10L 15/08* (2006.01)

(52) U.S. Cl.
CPC ........ *G10L 15/02* (2013.01); *G10L 2015/025* (2013.01); *G10L 15/063* (2013.01); *G10L 15/08* (2013.01); *G10L 15/22* (2013.01)

(58) Field of Classification Search
CPC ..... G10L 19/02; G10L 19/04; G10L 19/0018; G10L 19/167; G10L 25/03; G10L 25/78; G10L 15/22; G10L 15/02; G10L 15/187; G10L 15/1822; G10L 15/183; G10L 15/19; G10L 15/193; G10L 13/00; G06F 16/685; G06F 3/16; G06F 3/167; G09B 19/04
See application file for complete search history.

(56) References Cited

U.S. PATENT DOCUMENTS

| | | | |
|---|---|---|---|
| 10,395,649 B2 | 8/2019 | Li et al. | |
| 10,922,484 B1* | 2/2021 | Pereira | G06F 40/279 |
| 2014/0349259 A1 | 11/2014 | Ingrassia, Jr. et al. | |
| 2020/0184958 A1 | 6/2020 | Norouzi et al. | |
| 2020/0320898 A1* | 10/2020 | Johnson | G10L 15/08 |

(Continued)

OTHER PUBLICATIONS

"Fluency Tutor The Reading Assessment Tool", Retrieved from: https://www.texthelp.com/en-gb/products/fluency-tutor/, Retrieved Date: Apr. 13, 2021, 16 Pages.

(Continued)

*Primary Examiner* — Vu B Hang

(57) ABSTRACT

A method of identifying reading passages for reading progress can include receiving a set of error-indicated phonemes, wherein the set of error-indicated phonemes correspond to pronunciation errors identified in a recorded audio file from an individual reading an assigned passage aloud; determining corresponding error-indicated phonetic rules for each error-indicated phoneme of the set of error-indicated phonemes using a mapping of phonemes to phonetic rules; identifying at least one content passage from a set of content passages that satisfies a condition with respect to the error-indicated phonetic rules; and providing the at least one content passage for a new assignment for the individual to read aloud.

19 Claims, 5 Drawing Sheets

(56) References Cited

U.S. PATENT DOCUMENTS

2021/0050001 A1 2/2021 Chen et al.
2021/0082311 A1 3/2021 Karas

OTHER PUBLICATIONS

"Fluency Tutor® For Google™ Helps Busy Teachers Bring Struggling Readers up to Speed", Retrieved from: http://web.archive.org/web/20201206011947/https:/workspace.google.com/marketplace/app/fluency_tutor®_for_google/939870422462, Dec. 6, 2020, 5 Pages.

* cited by examiner

| | | | | | | | | | | |
|---|---|---|---|---|---|---|---|---|---|---|
| b | d | f | g | h | j | k | l | m | n | |
| ball | dog | fan | gate | hat | jam | kite | lips | moon | nut | |
| | | ph | gg | | g | c | ll | | kn | |
| | | photo | eggs | | age | can | all | | know | |
| | | | | | | ck | | | | |
| | | | | | | black | | | | |
| | | | | | | x->ks | | | | |
| | | | | | | next | | | | |
| | | | | | | ch | | | | |
| | | | | | | school | | | | |

FIG. 3

PHONEME MISPRONUNCIATION RANKING AND PHONEMIC RULES FOR IDENTIFYING READING PASSAGES FOR READING PROGRESS

BACKGROUND

Software learning tools for literacy development and education are a growing industry for improving outcomes from preschool through higher education. Through use of these software tools, learners may be able to improve a wide range of literacy skills, including comprehension, reading fluency, and written expression. Progress monitoring can be used to assess a student's performance while they are learning to read. When learning to read, assessments may be given for fluency of initial sounds (e.g., as first sound fluency), phoneme segmentation, nonsense words, and oral reading and various levels.

It can be a challenge to create lessons individualized for readers based on the areas that they need improvement because there may be more than one word or sound that the reader struggles with and different readers may struggle with different sounds.

BRIEF SUMMARY

Phoneme mispronunciation ranking and phonemic rules for identifying reading passages for reading progress are described.

A method of identifying reading passages for reading progress can include receiving a set of error-indicated phonemes, wherein the set of error-indicated phonemes correspond to pronunciation errors identified in a recorded audio file from an individual reading an assigned passage aloud; determining corresponding error-indicated phonetic rules for each error-indicated phoneme of the set of error-indicated phonemes using a mapping of phonemes to phonetic rules; identifying at least one content passage from a set of content passages that satisfies a condition with respect to the error-indicated phonetic rules; and providing the at least one content passage for a new assignment for the individual to read aloud. In some cases, the method can further include causing a suggested content passage to surface in a user interface.

The method can further include analyzing each content passage of the set of content passages for words containing the phonetic rules from the mapping of phonemes to phonetic rules; and tagging the set of content passages according to the phonetic rules contained therein such that content passages of the set of content passages have tags corresponding to the phonetic rules contained therein. The analyzing of the content passages can include identifying words in a passage; for each identified word, identifying phonetic rules that apply to that word, where the phonetic rules being from a set of phonetic rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 illustrates an example phonetic rule mapping for consonant rules with example words.

DETAILED DESCRIPTION

Phoneme mispronunciation ranking and phonemic rules for identifying reading passages for reading progress are described.

Advantageously, the described methods and systems not only identify problematic words that were mispronounced in a passage that was read aloud, but also can find other passages that have words with similar sounds as those problematic words. Indeed, by using a phoneme to phonetic rule mapping, the system does not even need to rely on finding the same word in other passages and can instead search based on the sound/phonetic rule. It is also possible to find passages that contain more than one phoneme of interest.

Figure 1:
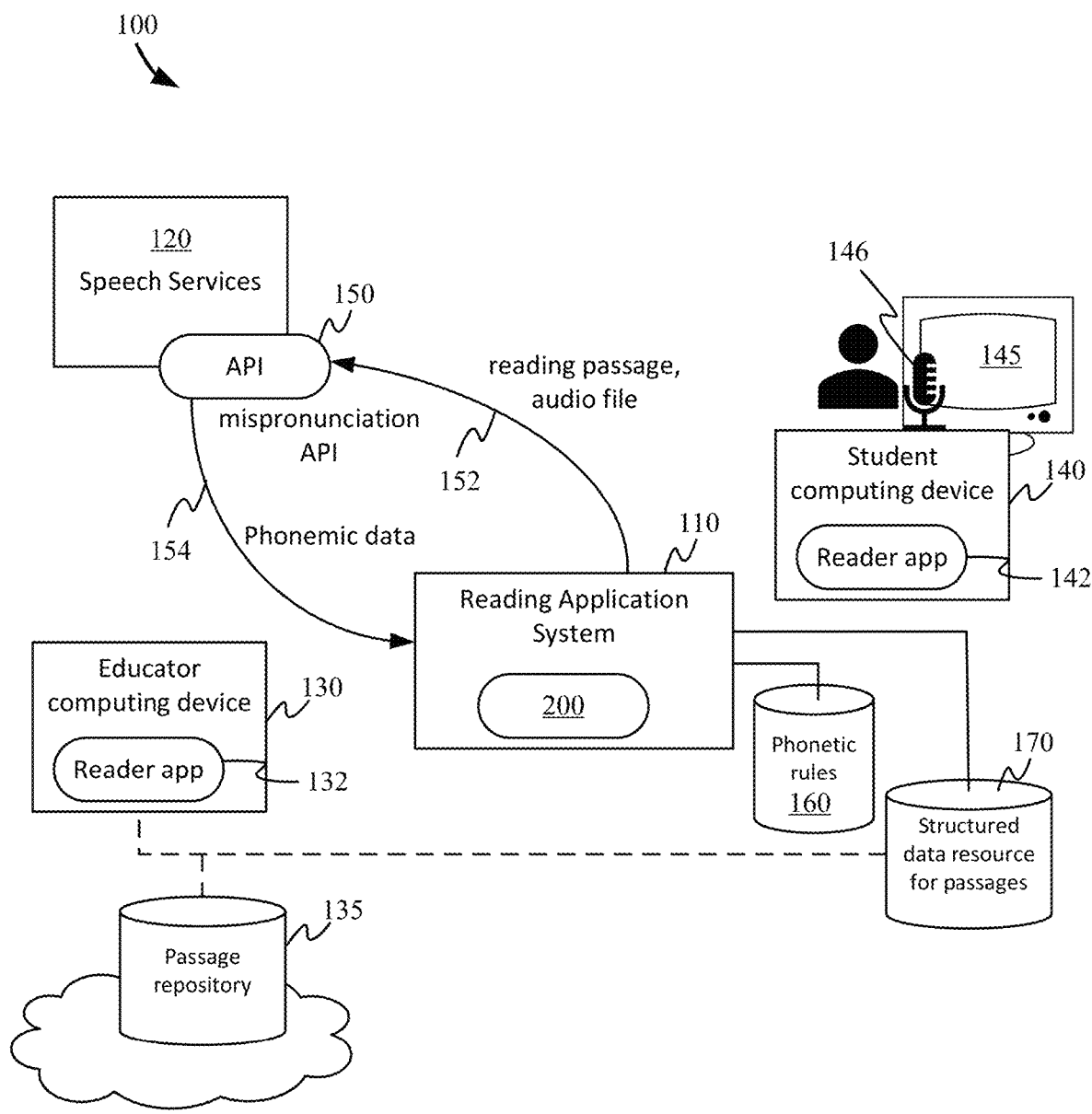
FIG. 1 illustrates an example operating environment for a reading application system with phoneme mispronunciation ranking and phonemic rules for identifying reading passages for reading progress.

FIG. 1 illustrates an example operating environment for a reading application system with phoneme mispronunciation ranking and phonemic rules for identifying reading passages for reading progress. Referring to FIG. 1, in an educational cloud-based environment 100, a reading application system 110, which may be embodied as one or more computing devices such as a server, can provide reader applications and/or services to users. Reading application system 110 can further communicate with or include speech services 120 for supporting analysis of audio recordings of passages that are read aloud.

An educator computing device 130 can enable an educator to access a reader application 132 provided by reading application system 110 (e.g., via a web browser, local application communicating with reading services, etc.). The educator can use the reader application 132 to assign passages (and other coursework) to students and track their progress, for example, in a dashboard. Reading passages assigned by the educator may be stored locally at the educator computing device 130 or in a passage repository 135, which may be part of cloud storage or on a private network.

A student can use a student computing device 140 to access a student reader application 142 provided by reading application system 110 (e.g., via a web browser, local application communicating with reading services, etc.). Student reader application 142 can enable a student to consume a variety of educational materials (e.g., via display 145 of student computing device 140), including assigned reading passages. In some cases, instead of or in addition to assignments of passages by an educator (e.g., via reader application 132 at educator computing device 130), student reader application 122 may support self-guided instruction (where passages may be assigned by the student and/or suggested by reading application system 110 from an available passage resource). Progress monitoring and individualized lessons based on the sounds/words that cause a student difficulty can be provided by the reading application system 110.

Reading application system 110 can apply phoneme mispronunciation ranking and phonemic rules for identifying reading passages for reading progress. Indeed, to carry out phoneme mispronunciation ranking and phonemic rules for identifying reading passages for reading progress, reading application system 110 includes instructions stored thereon that, when executed by one or more processors, perform processes 200 such as described with respect to FIG. 2.

Figure 2:
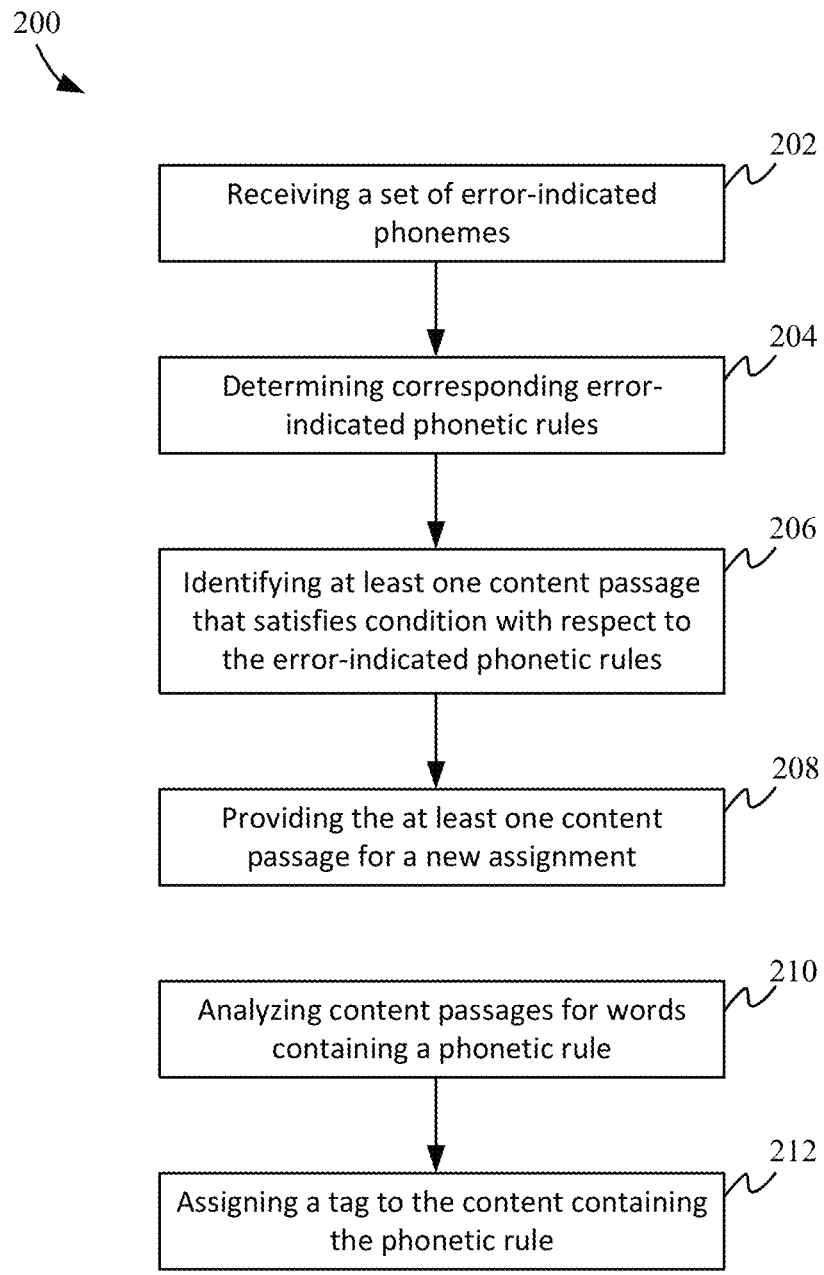
FIG. 2 illustrates a method for identifying reading passages for reading progress.

As described in more detail with respect to FIG. 2, in performing processes 200, reading application system 110 can include or communicate with a speech services mispronunciation application programming interface (API) 150 of the speech services 120, which receives an audio recording file (e.g., "recorded audio file") and reading passage (152) and returns phonemic data 154; can include or communicate with a phonetic rules resource 160, which may store mappings of phonemes and phonetic rules; and include or communicate with a structured data resource for passages 170, which may store passages or resource locators for passages (e.g., indicating location at the passage repository 135 or educator computing device 130) along with other information for use by the reading application system 110.

FIG. 2 illustrates a method for identifying reading passages for reading progress; and FIG. 3 illustrates an example phonetic rule mapping for consonant rules with example words.

Referring to FIG. 2, a method including processes 200 can be performed to identify reading passages for reading progress. Processes 200 can include receiving (202) a set of error-indicated phonemes; and determining (204) corresponding error-indicated phonetic rules for each error-indicated phoneme of the set of error-indicated phonemes using a mapping of phonemes to phonetic rules.

The set of error-indicated phonemes correspond to pronunciation errors identified in a recorded audio file from an individual reading an assigned passage aloud. The set of error-indicated phonemes can be received from a speech services API, for example as part of phonemic data 154 returned from mispronunciation API 150 as described with respect to FIG. 1.

A phoneme is any of the perceptually distinct units of sound in a specified language that distinguish one word from another, for example p, b, d, and t in the English words pad, pat, bad, and bat. A grapheme is a symbol used to identify a phoneme: it is the letter or group of letters representing the sound. Sounds/phonemes can be spelled with different graphemes (and can be one, two, or three letters on occasion).

A phonetic rule is the corresponding possible letters, combination of letters, order of letters that give the sound of a particular phoneme. The phonetic rule for a phoneme can include its grapheme.

The phoneme mispronunciation data (e.g., received for the set of error-indicated phonemes) is mapped to a set of phoneme rules (referred to herein as "phonetic rules") such that the error-indicated phonetic rules can be determined.

As shown in FIG. 3, some phonetic sounds in English include b, d, f, g, h, j, k, l, m, and n. These sounds map to those letters as well as ph (as in "photo") for f, gg (as in "egg") for g; g (as in "age") for j; c (as in "can"), ck (as in "black"), x (as in "next"), and ch (as in "school") for k, ll (as in "all") for l, and kn (as in "know") for n. The phonetic rules include more complicated constructs as well. For example, the rules include the letters for certain sounds based on where they are in the word and/or with respect to a vowel. Any suitable data structure may be utilized to store the mappings used by the system. For example, a table may be used.

Returning to FIG. 2, the results of the mapping are then used to automatically search across a specified content resource for reading passages that contain words and phonemes that would be beneficial for the student to practice.

Key words from the passages that include the phoneme(s) at issue can further be extracted for further use. In particular, processes 200 include identifying (206) at least one content passage from a set of content passages that satisfies a condition with respect to the error-indicated phonetic rules; and providing (208) the at least one content passage for a new assignment for the individual to read aloud. In some cases, the method can further include causing a suggested content passage to surface in a user interface.

The frequency of an error-indicated phoneme or phonemes in passages can be used to rank the passages.

In some cases, the at least one content passage satisfies the condition with respect to the error-indicated phonetic rules by having a highest number of words containing the corresponding error-indicated phonetic rules as compared to other passages in the set of content passages.

In some cases, for example, when it is desirable for a student to practice a passage that should result in fewer mispronunciations, the at least one content passage satisfies the condition with respect to the error-indicated phonetic rules by having a lowest number of words containing the corresponding error-indicated phonetic rules as compared to other passages in the set of content passages.

In some cases, a subset of the error-indicated phonetic rules can be selected for use in identifying content passages. For example, an educator may view, in a dashboard, the results of the error-indicated phonemes for a particular passage or, in some cases, an aggregated results view of results of error-indicated phonemes for a student over multiple reading assignments. From the dashboard, the educator can select which phonemes for the student to focus on next and trigger the identification of passages of operation 206. In some cases, the educator can select (or the system may automatically select) between two and five error-indicated phonemes from the recorded audio file of the assigned passage for use in identifying content passages.

In operation 206, the identifying of at least one content passage from the set of content passages can include searching metadata of the set of content passages for tags indicating the error-indicated phonetic rules; and ranking the content passages of the set of content passages according to a number of words having the error-indicated phonetic rules as reflected by the tags. In some cases, the searching operation can be performed for example, on structured data resource for passages 170 as described with respect to FIG. 1 using the mappings maintained at phonetic rules resource 160.

To enable the searching of the metadata, analyzing and tagging operations can be performed on content passages. For example, in a separate flow (that occurs before or during operations 202, 204, and 206), a reading application system can include analyzing (210) each content passage of the set of content passages for words containing the phonetic rules from the mapping of phonemes to phonetic rules; and tagging (212) the set of content passages according to the phonetic rules contained therein such that content passages of the set of content passages have tags corresponding to the phonetic rules contained therein (e.g., phonetic rule and corresponding frequency of occurrence). The granularity of the tagging may be on a per passage basis, per sentence basis, and even on a per word basis. In some cases, word banks may be included for use in assisting a student to practice a particular phonetic rule.

In one implementation, operation 210 can be carried out by identifying words in a passage; and for each identified word, identifying phonetic rules that apply to that word, the phonetic rules being from a set of phonetic rules (stored in phonetic rules resource 160). Operation 212 can be performed by tagging the passage with information of the identified phonetic rules of the identified words. Here, the information of the identified phonetic rules of the identified words may include each identified phonetic rule and its frequency in the passage or may include any identified phonetic rule having a frequency in the passage that satisfies a particular criterion such as that the frequency is above a threshold or that the frequency is within a range. The particular criterion can be used to optimize the tags so that very common phonemes are omitted, or a passage is not identified as containing a word with a particular phoneme unless a sufficient number of words with that phoneme are in the passage, as examples. The frequency information can be used for ranking the content passages. The system can identify the passages having the highest total number of words (with any error-identified phoneme/phonetic rule) or weigh certain phonemes/rules higher or lower, depending on implementation.

In some cases, only the error-indicated phonetic rules are applied during the analyzing and tagging operations. In one such case, the identification of passages in operation 206 can further include analyzing each content passage of the set of content passages for words containing the corresponding error-indicated phonetic rules; tagging the set of content passages according to the error-indicated phonetic rules contained therein such that content passages of the set of content passages have tags corresponding to the error-indicated phonetic rules contained therein; and determining, from the tags, the at least one content passage that satisfies the condition with respect to the error-indicated phonetic rules.

Figure 4:
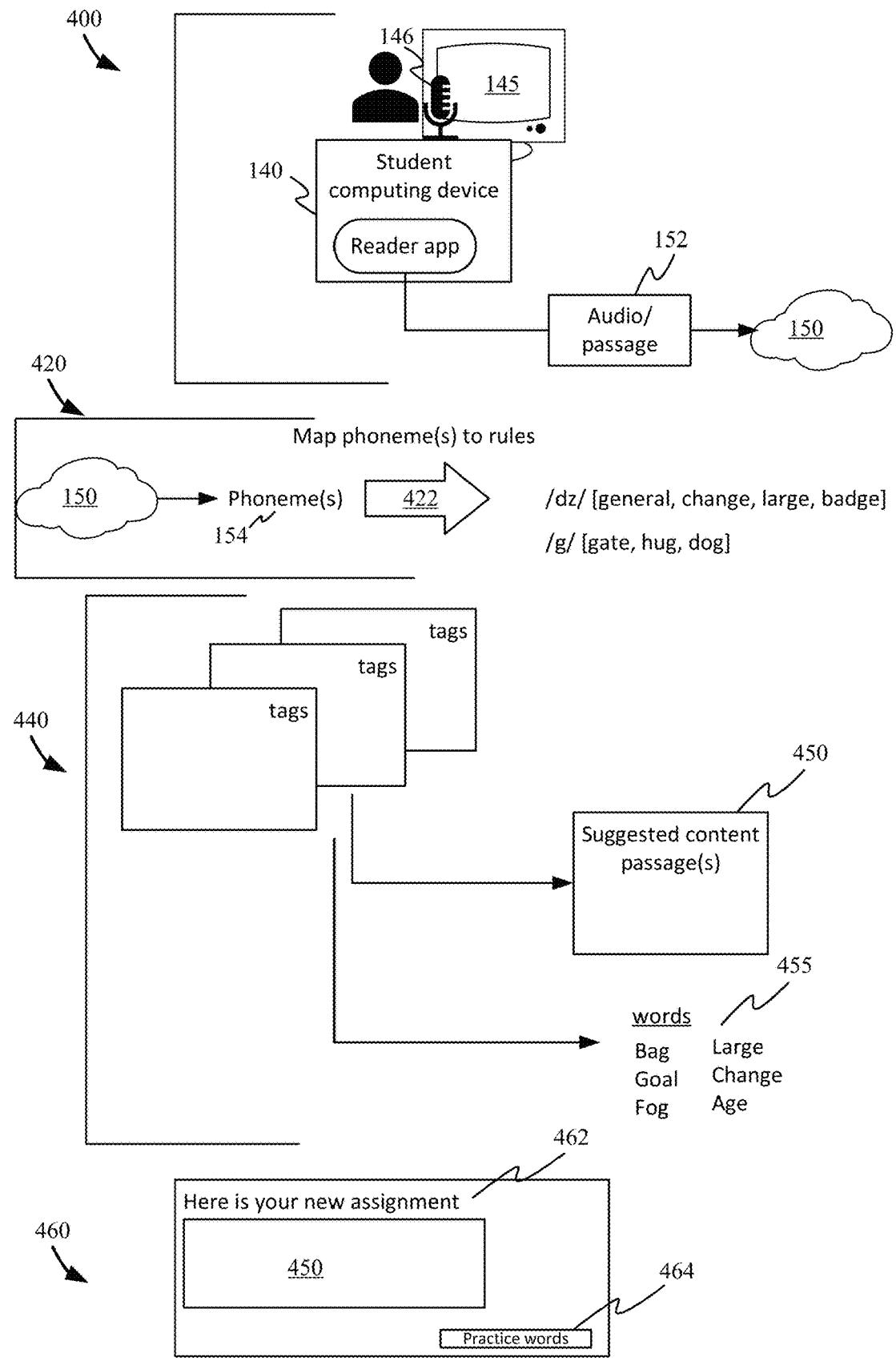
FIG. 4 illustrates a scenario for identifying reading passages for reading progress.

FIG. 4 illustrates a scenario for identifying reading passages for reading progress. Referring to FIG. 4 and with reference to the environment 100 of FIG. 1, in practice, as illustrated in vignette 400, a student can read assigned passages out loud and record themself (e.g., via microphone 146 of student computing device 140). The recordings and the passages are communicated to a speech services mispronunciation API 150 of the speech services 120. For example, a student may be assigned a passage by an educator. The student views the passage via display 145 and reads the passage aloud. The microphone 146 receives the audio input such that the student computing device 140 can record the reading aloud of the passage by the student. The audio recording file (e.g., "recorded audio file") and the reading passage (152) can then be communicated to the speech services mispronunciation API of the speech services 120 directly from student computing device 140 or via reading application system 110 (shown in FIG. 1). For example, a request for analysis of audio of the recorded file can be made via the speech services mispronunciation API.

As illustrated in vignette 420, the speech services mispronunciation API 150 returns phonemic data 154, indicating which phonemes of the reading passage were mispronounced by the student, to the reading application system 110 (shown in FIG. 1). At the reading application system, the phoneme(s) are mapped to phonetic rules (422). For example, the student may struggle with identifying the sound of the letter "g" and the error-indicated phonemes can map to the appropriate phonetic rules, illustrated by /dz/ (corresponding to words like general, change, large, badge) and /g/ (corresponding to words like gate, hug, dog).

As illustrated in vignette 440, the reading application system 110 can search a passages resource (e.g., structured data resource for passages 170 of FIG. 1) for tags indicating the error-indicated phonetic rules to identify at least one suggested content passage 450 from a set of content passages that satisfies a condition with respect to the error-indicated phonetic rules. In some cases, specific words 455 may be retrieved to assist the student in practicing pronunciation. For example, in the illustrated scenario, the system may include words such as bag, goal, fog, large, change, and age since the error-indicated phonemes were /dz/ and /g/.

As illustrated in vignette 460, the passage 450 can be provided to the student as a new assignment 462 to read aloud in their application. They may also be able to access the words 455 by selecting to view practice words 464. The particular passage provided to the student may be selected by the educator or automatically selected by the system based on the ranking of the passage. Here, the content passage 450 can be caused to surface in a user interface (e.g., of a student reader application) by selection of the educator, by selection of the student, or automatically by the system.

Figure 5:
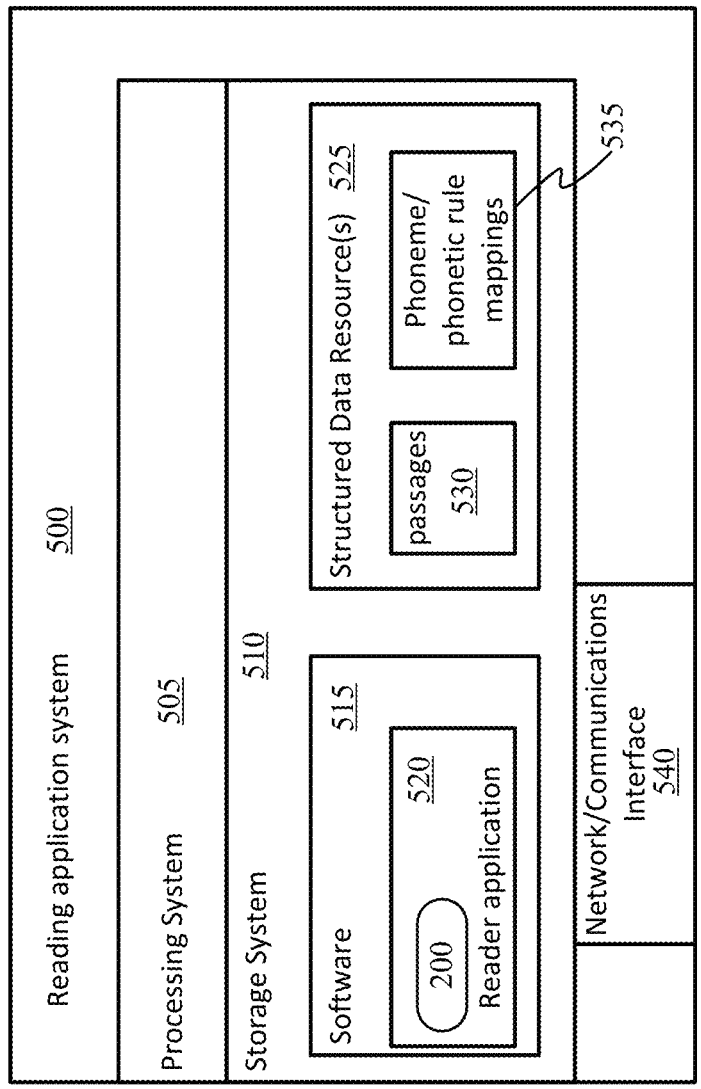
FIG. 5 shows a representation of an example reading application system.

FIG. 5 shows a representation of an example reading application system. Referring to FIG. 5, a reading application system 500 may be implemented within a single computing device or distributed across multiple computing devices or sub-systems that cooperate in executing program instructions. Accordingly, more or fewer elements described with respect to system 500 may be incorporated to implement a particular system. System 500 can be or include one or more blade server devices, standalone server devices, personal computers, routers, hubs, switches, bridges, firewall devices, intrusion detection devices, mainframe computers, network-attached storage devices, a reader, a mobile device, a personal digital assistant, a wearable computer, a smart phone, a tablet, a laptop computer, a gaming device or console, an entertainment device, a hybrid computer, a desktop computer, a smart television, appliance, and other types of computing devices.

In embodiments where the system 500 includes multiple computing devices, the system 500 can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

System 500 includes a processing system 505 of one or more hardware processors and a storage system 510. Examples of processors of the processing system 505 include general purpose central processing units (CPUs), graphics processing units (GPUs), field programmable gate arrays (FPGAs), application specific processors, and logic devices, as well as any other type of processing device, combinations, or variations thereof.

Storage system 510 may comprise any computer readable storage media readable by the processing system 505 and capable of storing software 515 executable by processor(s) of the processing system 505, including reader application services 520 with instructions for performing processes 200 as described with respect to FIG. 2. Storage system further includes one or more media providing structured data resource(s) 525 for storing passages (and/or associated information) 530 and phoneme/phonetic rule mappings 535.

Storage system 510 may include volatile and nonvolatile memories, removable and non-removable media implemented in any method or technology for storage of information, such as computer readable instructions, data structures, program modules, or other data. Examples of storage media of storage system 510 include random access memory, read only memory, magnetic disks, optical disks, CDs, DVDs, flash memory, magnetic cassettes, magnetic tape, magnetic disk storage or other magnetic storage devices, or any other suitable storage media. In no case does "storage media" or "computer-readable storage medium" consist of transitory, propagating signals.

Storage system 510 may be implemented as a single storage device but may also be implemented across multiple storage devices or sub-systems co-located or distributed relative to each other. Storage system 510 may include additional elements, such as a controller, capable of communicating with processing system 505.

Network interface 540 may include communications connections and devices that allow for communication with other computing systems over one or more communication network, including user computer devices (e.g., educator computing device 130 and student computing device 140 of FIG. 1) and speech services (e.g., speech services 120 of FIG. 1). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Communication to and from the applications at the various devices and systems, including with speech services (e.g., speech services 120) may be carried out via APIs. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. As mentioned above, in no case does "storage media" or "computer-readable storage medium" consist of transitory, propagating signals.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method implemented by a computer comprising at least one processor, the method comprising:
    tagging, by the at least one processor, content passages of a set of content passages according to a set of phonetic rules such that each content passage of the set of content passages is given at least one tag corresponding to at least one phonetic rule of the set of phonetic rules;
    receiving, by the at least one processor, a set of error-indicated phonemes, wherein the set of error-indicated phonemes correspond to pronunciation errors identified in a recorded audio file from an individual reading an assigned content passage from the set of content passages aloud;
    determining, by the at least one processor, corresponding error-indicated phonetic rules of the set of phonetic rules for each error-indicated phoneme of the set of error-indicated phonemes using a mapping of phonemes to phonetic rules;
    searching, by the at least one processor, a structured data resource for tags indicating the error-indicated phonetic rules to identify at least one content passage from the set of content passages that satisfies a condition with respect to the error-indicated phonetic rules; and
    providing, by the at least one processor, the at least one content passage for a new assignment for the individual to read aloud.

2. The method of claim 1, wherein the at least one content passage satisfies the condition with respect to the error-indicated phonetic rules by having a highest number of words containing the corresponding error-indicated phonetic rules as compared to other passages in the set of content passages.

3. The method of claim 1, wherein the at least one content passage satisfies the condition with respect to the error-indicated phonetic rules by having a lowest number of words containing the corresponding error-indicated phonetic rules as compared to other passages in the set of content passages.

4. The method of claim 1, further comprising:
    receiving a selection of at least one error-indicated phonetic rule of the error-indicated phonetic rules, wherein the condition with respect to the error-indicated phonetic rules comprises a condition containing a highest number of words with the selected at least one error-indicated phonetic rule or containing a number of words above a particular threshold number of words containing the selected at least one error-indicated phonetic rule.

5. The method of claim 1, wherein identifying the at least one content passage from the set of content passages comprises ranking the content passages of the set of content passages according to a number of words having the error-indicated phonetic rules as reflected by the tags.

6. The method of claim 5, wherein identifying the at least one content passage from the set of content passages further comprises analyzing each content passage of the set of content passages for words containing the corresponding error-indicated phonetic rules.

7. The method of claim 5, further comprising analyzing each content passage of the set of content passages for words containing the phonetic rules from the mapping of phonemes to phonetic rules.

8. The method of claim 1, wherein identifying the at least one content passage from the set of content passages that satisfies the condition with respect to the error-indicated phonetic rules comprises:
   analyzing each content passage of the set of content passages for words containing the corresponding error-indicated phonetic rules; and
   determining, from the tags, the at least one content passage that satisfies the condition with respect to the error-indicated phonetic rules.

9. The method of claim 8, wherein the at least one content passage satisfies the condition with respect to the error-indicated phonetic rules by having a highest number of words containing the corresponding error-indicated phonetic rules.

10. The method of claim 9, wherein the corresponding error-indicated phonetic rules correspond to between two and five error-indicated phenomes from the recorded audio file of the assigned content passage.

11. The method of claim 1, wherein each content passage of the set of content passages is further given at least one tag corresponding to frequency occurrence.

12. The method of claim 1, further comprising:
   receiving the recorded audio file from the individual reading the assigned content passage aloud; and
   requesting analysis of audio of the recorded audio file, via a speech services mispronunciation application programming interface (API), wherein the set of error-indicated phonemes are received from the analysis of the audio of the recorded audio file via the speech service mispronunciation API.

13. A reading application system, comprising:
   a processing system;
   a storage system comprising a passages resource and phoneme to phonetic rule mappings resource; and
   instructions stored at the storage system that when executed by the processing system, direct the reading application system to at least:
      tag content passages of a set of content passages according to a set of phonetic rules such that each content passage of the set of content passages is given at least one tag corresponding to at least one phonetic rule of the set of phonetic rules;
      receive a set of error-indicated phonemes, wherein the set of error-indicated phonemes correspond to pronunciation errors identified in a recorded audio file from an individual reading an assigned content passage from the set of content passages aloud;
      determine corresponding error-indicated phonetic rules of the set of phonetic rules for each error-indicated phoneme of the set of error-indicated phonemes using a mapping of phonemes to phonetic rules;
      search a structured data resource for tags indicating the error-indicated phonetic rules to identify at least one content passage from the set of content passages that satisfies a condition with respect to the error-indicated phonetic rules; and
      provide the at least one content passage for a new assignment for the individual to read aloud.

14. The reading application system of claim 13, wherein the at least one content passage satisfies the condition with respect to the error-indicated phonetic rules by having a highest number of words containing the corresponding error-indicated phonetic rules as compared to other passages in the set of content passages.

15. The reading application system of claim 13, wherein the at least one content passage satisfies the condition with respect to the error-indicated phonetic rules by having a lowest number of words containing the corresponding error-indicated phonetic rules as compared to other passages in the set of content passages.

16. The reading application system of claim 13, wherein the instructions further direct the reading application system to receive a selection of at least one error-indicated phonetic rule of the error-indicated phonetic rules, wherein the condition with respect to the error-indicated phonetic rules comprises a condition containing a highest number of words with the selected at least one error-indicated phonetic rule or containing a number of words above a particular threshold number of words containing the selected at least one error-indicated phonetic rule.

17. The reading application system of claim 13, wherein the instructions, to identify the at least one content passage from the set of content passages, direct the reading application system to rank the content passages of the set of content passages according to a number of words having the error-indicated phonetic rules as reflects by the tags.

18. The reading application system of claim 17, wherein the instructions, to identify the at least one content passage from the set of content passages, further direct the reading application system to analyze each content passage of the set of content passages for words containing the corresponding error-indicated phonetic rules..

19. A computer readable storage medium having instructions stored thereon that, when executed by a computing system, direct the computing system to perform a method comprising:
   tagging, by the computing system, content passages of a set of content passages according to a set of phonetic rules such that each content passage of the set of content passages is given at least one tag corresponding to at least one phonetic rule of the set of phonetic rules;
   receiving, by the computing system, a set of error-indicated phonemes, wherein the set of error-indicated phonemes correspond to pronunciation errors identified in a recorded audio file from an individual reading an assigned content passage from the set of content passages aloud;
   determining, by the computing system, corresponding error-indicated phonetic rules of the set of phonetic rules for each error-indicated phoneme of the set of error-indicated phonemes using a mapping of phonemes to phonetic rules;
   searching, by the computing system, a structured data resource for tags indicating the error-indicated phonetic rules to identify at least one content passage from the set of content passages that satisfies a condition with respect to the error-indicated phonetic rules; and providing, by the computing system, the at least one content passage for a new assignment for the individual to read aloud.

\* \* \* \* \*